United States Patent [19]

Rosaen et al.

[11] 4,183,812

[45] Jan. 15, 1980

[54] FLUID FILTERING DEVICE

[76] Inventors: Borje O. Rosaen, 4031 Thornoaks Dr.; Dale P. Fosdick, 3000 Hunting Valley, both of Ann Arbor, Mich. 48104

[21] Appl. No.: 5,342

[22] Filed: Jan. 22, 1979

[51] Int. Cl.² .............................................. B01D 35/14
[52] U.S. Cl. .................................... 210/131; 210/447
[58] Field of Search ............... 210/131, 133, 398, 399, 210/446–449, 451, 452

[56] References Cited

U.S. PATENT DOCUMENTS

| | | | |
|---|---|---|---|
| 3,355,021 | 11/1967 | Jones | 210/446 X |
| 3,421,627 | 1/1969 | Lammers | 210/131 |
| 3,498,110 | 2/1970 | Rosaen | 210/131 X |
| 3,757,951 | 9/1973 | Redenbarger et al. | 210/131 |
| 3,993,561 | 11/1976 | Swearingen | 210/131 |
| 4,082,665 | 4/1978 | Schneider et al. | 210/446 X |

*Primary Examiner*—William A. Cuchlinski, Jr.
*Attorney, Agent, or Firm*—Gifford, Chandler, VanOphem, Sheridan & Sprinkle

[57] ABSTRACT

A fluid filtering device is provided for connection with a fluid line. The fluid device includes a housing having a fluid inlet on one end, a fluid outlet on the other end and a fluid passage for connecting the inlet to the outlet. The fluid passage includes an elongated cylindrical wall portion along its length. A filter assembly comprising a tubular filter element open at each end and a cap attached to a first axial end of the filter element is insertable within the housing so that the other or second end of the filter element is received within and sealingly engages the cylindrical wall portion of the fluid passage when the cap is connected to the housing. With the filter assembly thus positioned, the outer periphery or exterior of the tubular filter element is open to the housing inlet while, conversely, the interior of the filter element is open to the housing fluid outlet. The filter element furthermore is axially slidably mounted between a first and second position with respect to the cap while a helical spring urges the filter element towards its first position. In the first position, the first axial end of the filter element sealingly abuts against the cap. Conversely, as the differential pressure across the filter element increases, the filter element moves outwardly from the cap and towards its second position and uncovers fluid bypass ports through the cap. The bypass ports enable direct fluid flow from the housing inlet and to the outlet while bypassing the filter element.

11 Claims, 4 Drawing Figures

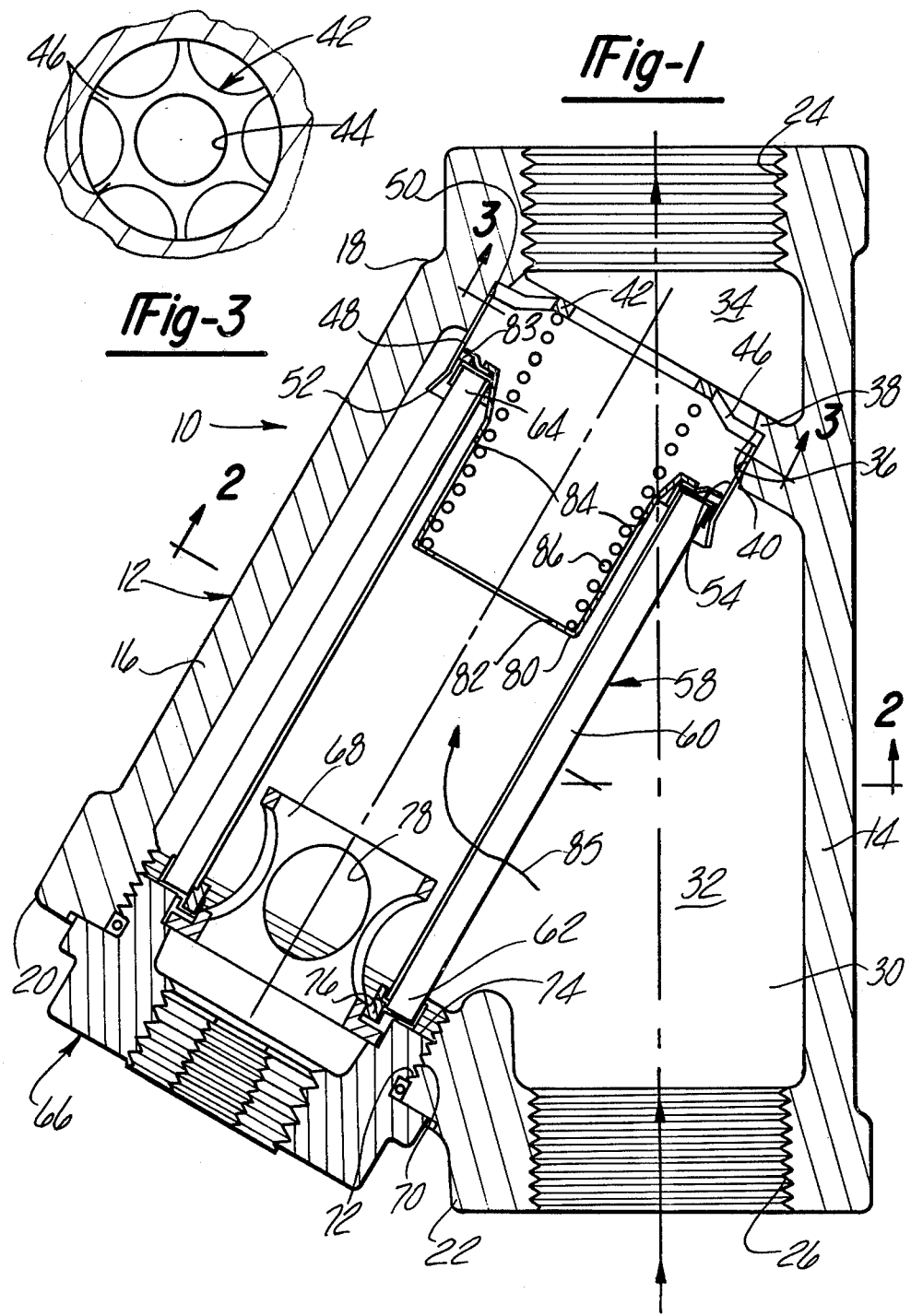

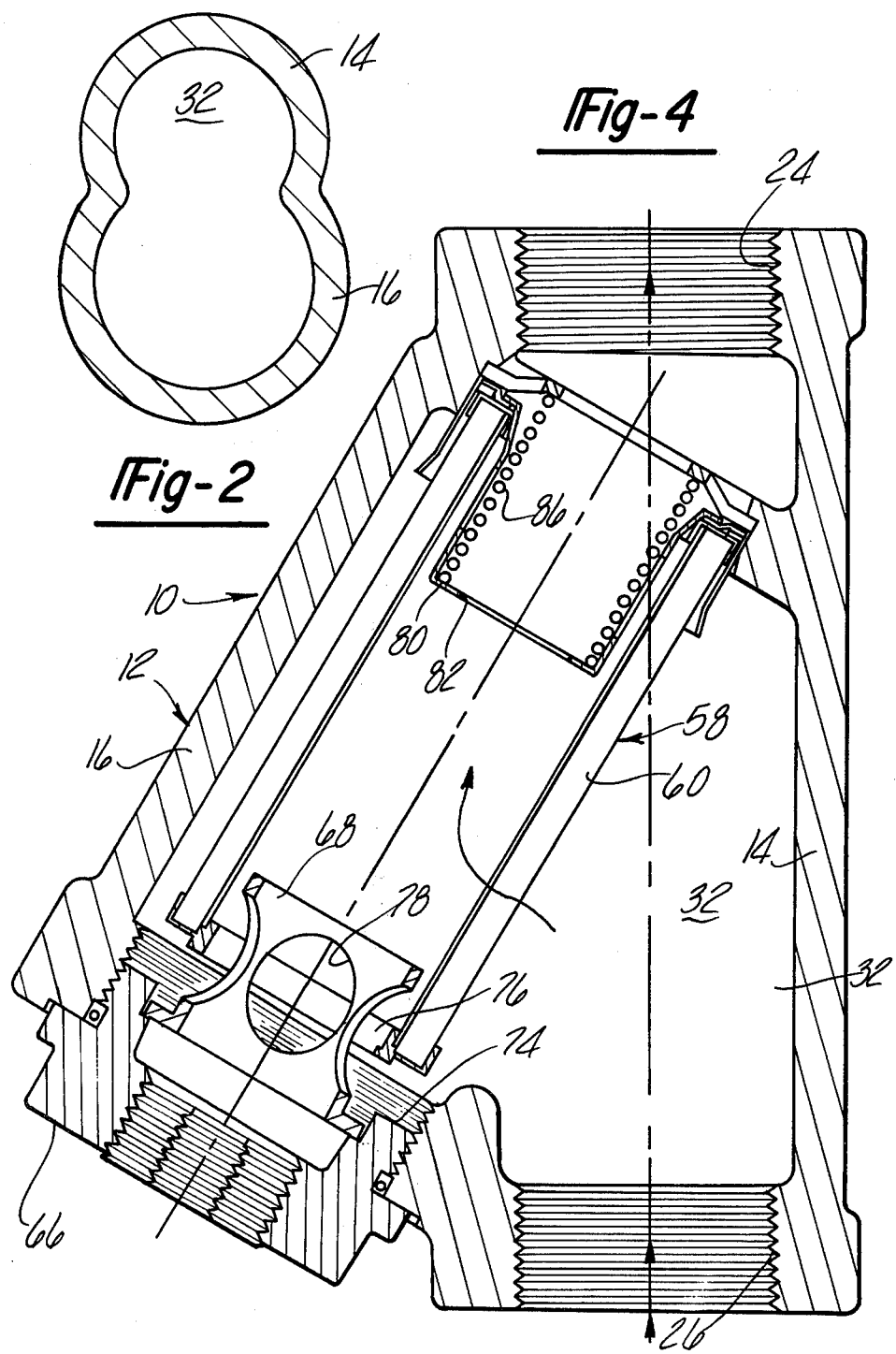

FLUID FILTERING DEVICE

BACKGROUND OF THE INVENTION

I. Field of the Invention

The present invention relates generally to fluid filtering devices and, more particularly, to an inline fluid filtering device with a filter element bypass means.

II. Description of the Prior Art

There are, of course, a number of previously known fluid filtering devices which are adapted for connection in series with a fluid line in a fluid system. Such a fluid system can, for example, comprise a hydraulic system in which the fluid filtering device is connected to either the suction line from a hydraulic reservoir and to the hydraulic pump or the return line from the hydraulic system into the fluid reservoir. In either case, it is necessary to maintain fluid flow through the filtering device in order to prevent pump cavitation, loss of system efficiency or even damage to the hydraulic system.

It is well known in the art of fluid filtering devices that as a filter element becomes increasingly clogged with debris, the pressure drop across the filter element likewise increases and diminishes the outward flow from the filter element. As the decreasing fluid flow becomes excessive, it can cause one or more of the aforementioned problems.

In order to protect the hydraulic or other fluid system from reduced fluid flow resulting from a clogged filter element, many previously known filtering devices include bypass means for bypassing the fluid flow around the filter element at a predetermined pressure drop across the filter element which is indicative of excess filter clogging. These previously known filter devices with bypass means, however, are disadvantageous in several different respects.

One disadvantage of these previously known bypass valves is that such valves are oftentimes complex in construction and are constructed from a multiplicity of separate components. The complexity of these previously known bypass valves not only increases the initial construction or manufacturing cost of such valves, but, in addition, such bypass valves are prone to failure since failure of any one of the numerous bypass valve components can render the entire bypass valve inoperable.

Moreover, many of these previously known bypass valves simply comprise a circular valve member urged against a valve seat by helical spring or other conventional resilient means. The valve member, which is of a relatively small area, forms the entire pressure sensing means and, due to its relatively small size, the bypass valve member opens only slightly and somewhat spasmatically. Consequently, the fluid flow through the filter device, even with the bypass valve in its open position, is often at a lower than desired flow rate.

A still further disadvantage of these previously known bypass valves is that such valves are typically secured directly to and within the housing for the fluid device. Consequently, when maintenance and/or cleaning of the bypass valve assembly is required, time consuming disassembly of virtually the entire fluid filtering device is usually required. Such disassembly of the fluid filtering device also results in expensive and prolonged downtime for the hydraulic, or other fluid, system.

A still further disadvantage of these previously known filter devices with bypass valve means is that the main housing for the fluid filtering device is of complex, and therefore, expensive construction. Moreover, many of these devices are not readily suitable for direct connection with a fluid line but instead require modification of the fluid system and the fluid fittings in order to accommodate the fluid filter device. Lastly, these previously known fluid filtering devices also require the use of baffles within the device main housing in order to insure a uniformly distributed fluid flow through the filter element. Such baffles also increase the complexity and cost of the main housing.

SUMMARY OF THE PRESENT INVENTION

The present invention provides a simple and inexpensive fluid filtering device for connection with a fluid line which overcomes the above mentioned disadvantages of the previously known filter devices.

In brief, the filter device according to the present invention comprises a housing having a fluid inlet at one end, a fluid outlet at the other end and a fluid passageway connecting the inlet to the outlet. A cylindrical wall portion is formed along the length of the fluid passageway between the inlet and the outlet within the housing.

A filter assembly is also provided for connection with the housing and includes a tubular filter element which is open on both axial ends. An end cap includes a tubular member which is axially slidably received within the interior of the filter element. The entire filter element is axially slidable between a first and a second position with respect to the end cap so that with the filter element in the first axial position the filter element sealingly abuts against the cap and fluidly closes the first end of the filter element. Conversely, in its second axial position the filter element is spaced outwardly away from the end cap and the filter element uncovers fluid bypass ports formed through the tubular member.

The filter assembly is insertable through an opening in the housing so that at the other or second end of the filter element is received within and sealingly engages the cylindrical wall portion of the fluid passageway and the end cap is removably connected to and fluidly closes the housing opening. In doing so, the outer periphery of the filter element is open to the housing inlet while the interior of the filter element is open to the housing outlet via the cylindrical wall portion. A spring between the housing and the filter element urges the filter element to its first axial position so that the first end of the filter element abuts against and is fluidly closed by the end cap. Consequently, fluid flow into the housing inlet passes through and into the interior of the filter element, through the cylindrical portion of the fluid passageway and to the housing outlet.

During operation, as the filter becomes increasingly clogged by foreign debris within the fluid, the differential pressure across the filter element increases in the conventional fashion. When the fluid pressure differential across the filter element exceeds a predetermined amount, indicative of excessive filter clogging, the fluid pressure shifts the filter element outwardly away from the end cap toward its second axial position and against the force of the helical spring. Upon axially shifting, the filter element uncovers the fluid bypass ports through the tubular member of the end cap thus permitting direct fluid flow from the fluid inlet and to the fluid outlet via the interior of the filter element. Preferably the area of the fluid bypass ports increases proportionately with the axially outward displacement of the filter element so that the fluid bypassing is not only smooth in operation but also enables a large and constant volumetric flow rate through the filter device despite fluid bypassing.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a longitudinal sectional view illustrating the fluid filtering device according to the present invention;

FIG. 2 is a sectional view off the housing taken substantially along and 2—2 in FIG. 1 and with filter assembly removed;

FIG. 3 is a sectional view taken substantially along line 3—3 in FIG. 1; and

FIG. 4 is a longitudinal sectional view of the fluid filtering device according to the present invention but showing the fluid filtering device in a fluid bypass condition.

DETAILED DESCRIPTION OF THE PRESENT INVENTION

With reference first to FIGS. 1 and 2, the fluid filtering device 10 according to the present invention is thereshown and comprises a housing 12 having a first substantially cylindrical portion 14 and a second substantially cylindrical portion 16. The housing portions 14 and 16 are preferably integrally formed with each other and intersect at one end 18 of the housing 12 so that the free end 20 of the housing portion 16 lies closely adjacent the free end 22 of the housing portion 14. The axes of the housing portions 14 and 16 as shown in FIG. 1, intersect each other at an angle of approximately 30°.

A fluid outlet 24 is formed at the end 18 of the housing portion 14 while a fluid inlet 26 is formed at the opposite end 22 of the housing portion 14. Both the fluid inlet 26 and the outlet 24 are internally threaded and adapted to receive conventional fluid couplings (not shown).

A fluid passageway 30 fluidly connects the fluid inlet 26 to the outlet 24 and comprises a fluid inlet chamber 32 and a fluid outlet chamber 34. A fluid port 36 within the housing 12 interconnects the inlet chamber 32 with the outlet chamber 34. A radially inwardly protruding lip 38 around the port 36 forms an annular abutment surface 40 adjacent the outlet chamber 34.

With reference now to FIGS. 1 and 3, a spring seat 42 having a central opening 44 and a plurality of outwardly protruding arms 46 is positioned within the port 36 so that the outer free ends of the arms 46 abut against the annular surface 40. A tubular cylindrical sleeve 48 is then press fit within the port 36 so that one axial end 50 of the sleeve 48 abuts against the spring retainer 42 around its outer periphery while the other axial end 52 protrudes outwardly into the inlet chamber 32 for a reason which will be subsequently described. By its connection to the port 36 the sleeve 50 forms an elongated cylindrical wall portion 54 along the fluid passageway 30.

A filter assembly 58 is provided for connection with the housing 12 and comprises a tubular cylindrical filter element 60 which is open at both ends 62 and 64. An end cap 66 is coaxially mounted to the end 62 of the filter element 60 and includes a tubular member 68 which is axially slidably received within the interior of the filter element 60. The end cap 66 is externally threaded at 70 and cooperates with an internally threaded opening 72 at the end 20 of the housing portion 16. The inner end of the end cap 66 also forms an annular abutment surface 74 which extends radially outwardly from the tubular member 68.

The filter element 60 is axially slidable with respect to the end cap 66 and is movable between a first position shown in FIG. 1 and a second position shown in FIG. 4. In its first position, the axial end 62 of the filter element 60 abuts against the annular abutment surface 74 on the end cap 66. In this position, an annular seal 76 on the filter element 60 sealingly engages the tubular member 68 so that the end cap 66 fluidly closes the axial end 62 of the filter element 60. Conversely, as the filter element 60 moves towards its second axial position (FIG. 4) in which the axial end 62 of the filter element 60 is spaced axially away from the end cap abutment surface 74, the filter element 60 will uncover fluid bypass ports 78 formed through and around the end cap tubular member 68. The bypass ports 78 are preferably circular in shape so that the amount of area open through the bypass ports 78 increases proportionately with the axial displacement of the filter element 60 away from the end cap 66. Moreover, the bypass ports 78 are preferably spaced axially away from the axially outermost position of the seal 76 so that the filter assembly 58 must axially displace a predetermined amount before any fluid bypassing occurs.

An annular spring retainer 80 having a central opening 82 is secured to the other axial end 64 of the filter element 60 so that the spring retainer 80 extends partially into the interior of the filter element 60. Cutouts 84, however, are preferably formed through the sides of the spring retainer 80 so that the spring retainer 80 does not inhibit or interfere with the fluid flow through the filter element 60. A helical spring 86 in a state of compression is disposed between the spring seat 42 and the spring retainer 80.

The filter assembly 58 is connected to the housing 12 by inserting the filter element 60 through the threaded openings 72 in the housing portion 16 and so that the end 64 of the filter element 60 is received within the interior of the sleeve 48. The end 52 of the sleeve 48 is preferably flared outwardly to aid in receiving the end 64 of the filter element 60. An annular seal 81 at the end 64 of the filter element 60 provides a sealing engagement between the filter element 60 and the cylindrical wall portion 54 of the fluid passageway 30. The end cap 66 is then screwed into the housing aperture 72 thus detachably securing the filter assembly 58 to the housing 12. In doing so, the helical spring 86 is placed in a state of compression and thus urges the end 62 of the filter element 60 against the end cap abutment surface 74.

With the filter assembly 58 connected to the housing 12 in the above described fashion, fluid flow into the housing inlet 26 passes through the exterior of the filter element 60 and into the interior of the filter element 60 as shown by arrow 85 whereby the filter element 60 removes the impurities from the fluid. From the interior of the filter element 60, the fluid passes through the spring retainer openings 82 or 84, the port 36 and to the fluid outlet 24. Since the filter element 60 intersects the fluid passageway 30 at approximately 30°, however, no baffles are required within the housing 12 to insure an even distribution of fluid flow through the filter element 60. In addition, the housing 12 is preferably physically oriented with respect to the fluid system so that the housing outlet 24 is above, and preferably directly vertically above, the fluid inlet 26. This insures that any air entrapped within the fluid will pass through the fluid outlet rather than become entrapped within the housing 12.

After prolonged operation of the filter element 60, the element 60 will become clogged with debris from the fluid and cause an increase in the differential pressure across the filter element 60 in the well known fashion. When the differential pressure across the filter element 60 exceeds a predetermined value, indicative of excessive filter clogging and which is determined by the spring constant of the helical spring 86, the filter element 60 will gradually shift axially away from the end cap 66 and towards its second position illustrated in FIG. 4. AS the filter element 60 shifts axially away from the end cap 66, the axial end 62 of the filter element 60 uncovers the bypass ports 78 in the end cap tubular member 68 thus permitting direct fluid communication from the housing inlet and to the outlet 24 while bypassing the filter element 60. Moreover, since the bypass ports 78 are circular in shape, the exposed area of the bypass ports 78, and thus the amount of fluid bypassing, increases proportionately with the axial displacement of the filter element 60 thus producing a smooth fluid bypassing action. Moreover, due to the large area of the bypass ports 78, when the filter element 60 has fully displaced to its second axial position, large volumetric fluid flow rates can be achieved despite the bypassing condition.

As previously described, the bypass ports 78 are positioned so that the filter element 60 must shift axially outwardly towards its second position the predetermined amount before any fluid bypassing whatsoever can occur. This provision prevents spasmodic and unintended fluid bypassing through the filter device due to transient pressure surges through the fluid filtering device 10.

From the foregoing it can be seen that the fluid filtering device 10 according to the present invention provides a simple, inexpensive and yet totally effective fluid filtering device. Moreover, since the inlet 26 is coaxial with the outlet 24, the filtering device 10 can be simply and directly fluidly connected to any lineal section of fluid line of a fluid system. In practice, the fluid filtering device 10 according to the present invention is particularly suitable for connection to the suction line of a hydraulic pump.

Having described my invention, however, many modifications thereto will become apparent to those skilled in the art to which it pertains without deviation from the spirit of the invention as defined by the scope of the appended claims.

I claim:

1. A fluid filtering device adapted for connection with a fluid line, said device comprising:
   a housing having an inlet and an outlet;
   fluid passage means formed through said housing for fluidly connecting said inlet with said outlet, said fluid passage means having an elongated cylindrical wall portion formed between said inlet and said outlet;
   a filter assembly comprising a tubular filter element open at each axial end and a cap axially slidably mounted to a first axial end of the filter element, said cap including means for fluidly closing said first end of said filter element when said first end axially abuts against said cap and means for fluidly opening said first end of the filter element when said filter element is spaced outwardly from said cap;
   means for attaching said filter assembly to said housing so that the other end of the filter element is received within and sealingly engages the cylindrical wall portion, the outer periphery of said tubular filter element being open to said inlet and the interior of the filter element being open to said outlet;
   said filter element being longitudinally slidable between a first position in which the first end of the filter element sealingly abuts against the cap and a second position in which said filter element is spaced outwardly from said cap; and
   means for resiliently urging said filter element towards its first position.

2. The invention as defined in claim 1 wherein said cap means further comprises a tubular member axially slidably received within the interior of said filter element and through the first end thereof, said tubular member having at least one bypass formed therethrough, said bypass port being open to said inlet when said filter element is in said second position.

3. The invention as defined in claim 2 wherein the amount of area of the bypass port open to the fluid inlet increases proportionately with the axial displacement of the filter element away from the cap.

4. The invention as defined in claim 2 wherein said bypass port becomes open to the inlet only when said filter element is spaced away from said cap a predetermined distance.

5. The invention as defined in claim 2 wherein said filter element includes an annular seal which sealingly engages the outer periphery of the tubular member.

6. The invention as defined in claim 3 wherein said tubular member includes at least two bypass ports, each bypass port being substantially circular in shape.

7. The invention as defined in claim 1 wherein said resilient means comprises a helical spring, said device further comprising a spring seat secured to said housing across one axial end of the said cylindrical wall portion and a spring retainer secured to said other end of the filter element, said spring being positioned between said spring seat and said spring retainer.

8. The invention as defined in claim 7 wherein said cylindrical wall portion comprises a tubular cylindrical sleeve secured to said housing.

9. The invention as defined in claim 8 wherein said spring seat is sandwiched between one axial end of the sleeve and an annular abutment surface formed in said housing.

10. The invention as defined in claim 1 wherein said housing comprises a first elongated tubular cylindrical portion and a second elongated tubular cylindrical portion, said housing portions intersecting each other at one end of each portion, said last mentioned end of the first housing portion forming the fluid outlet and the other end of the first housing portion forming the fluid inlet, the other end of the second housing portion having an opening through which the filter element is removably insertable.

11. The invention as defined in claim 10 wherein said housing portions are integrally formed with each other and intersect each other at substantially 30°.

* * * * *

UNITED STATES PATENT AND TRADEMARK OFFICE
CERTIFICATE OF CORRECTION

PATENT NO. : 4,183,812
DATED : January 15, 1980
INVENTOR(S) : Borje O. Rosaen and Dale P. Fosdick It is certified that error appears in the above-identified patent and that said Letters Patent are hereby corrected as shown below:

Column 3, line 12, delete "off" and insert --of-- therefor;

Column 3, line 13, after "along" delete "and";

Column 5, line 15, delete "AS" and insert --As--.

Signed and Sealed this

Twentieth Day of May 1980

[SEAL]

Attest:

SIDNEY A. DIAMOND

Attesting Officer     Commissioner of Patents and Trademarks